(12) United States Patent
Wang et al.

(10) Patent No.: US 9,176,589 B2
(45) Date of Patent: Nov. 3, 2015

(54) GESTURE RECOGNITION APPARATUS AND METHOD OF GESTURE RECOGNITION

(71) Applicants: Xiaojun Wang, Shenzhen (CN); Qi Tang, Shenzhen (CN)

(72) Inventors: Xiaojun Wang, Shenzhen (CN); Qi Tang, Shenzhen (CN)

(73) Assignee: AAC Technology Pte, Ltd., Singapore (SG)

( * ) Notice: Subject to any disclaimer, the term of this patent is extended or adjusted under 35 U.S.C. 154(b) by 92 days.

(21) Appl. No.: 14/070,638

(22) Filed: Nov. 4, 2013

(65) Prior Publication Data

US 2014/0125582 A1    May 8, 2014

(30) Foreign Application Priority Data

Nov. 5, 2012   (CN) .......................... 2012 1 0435804

(51) Int. Cl.
*G09G 5/00*   (2006.01)
*G06F 3/01*   (2006.01)

(52) U.S. Cl.
CPC ...................................... *G06F 3/017* (2013.01)

(58) Field of Classification Search
None
See application file for complete search history.

(56) References Cited

U.S. PATENT DOCUMENTS

| 8,749,485 B2 * | 6/2014 | Tan et al. ...................... 345/156 |
| 2010/0202656 A1 * | 8/2010 | Ramakrishnan et al. ..... 382/103 |
| 2013/0154919 A1 * | 6/2013 | Tan et al. ...................... 345/156 |

* cited by examiner

*Primary Examiner* — Kenneth B Lee, Jr.
(74) *Attorney, Agent, or Firm* — IPro, Inc.; Na Xu

(57) ABSTRACT

One embodiment of the invention discloses a gesture recognition apparatus including a left source configured to generate a left basic signal, a right source configured to generate a right basic signal, a detector configured to detect the left basic signal, the right basic signal and Doppler shift signals of the left and right basic signals after reflection by a hand, the detector disposed between the left source and the right source, and a processer configured to deal with signals from the detector and recognize a gesture. And a method of gesture recognition is also disclosed.

17 Claims, 5 Drawing Sheets

| Gesture | Specification |
|---------|---------------|
| L2R | Movement of hand from region L to region R |
| R2L | Movement of hand from region R to region L |
| C2L | Movement of hand from region C to region L |
| C2R | Movement of hand from region C to region R |
| C2U | Movement of hand from region C to region U |
| U2C | Movement of hand from region U to region C |
| UCU | Movement of hand from region U to region C then back to region U |
| L2C | Movement of hand from region L to region C |
| R2C | Movement of hand from region R to region C |

Fig.7

| Gesture | State sequence |
|---------|----------------|
| L2R | [+1+1、-1+1、-1-1] |
| R2L | [+1+1、+1-1、-1-1] |
| C2L | [+1-1、-1-1] |
| C2R | [-1+1、-1-1] |
| C2U | [-1-1] |
| U2C | [+1+1] |
| UCU | [+1+1、-1-1] |
| L2C | [+1+1、-1+1] |
| R2C | [+1+1、+1-1] |

Fig.8

GESTURE RECOGNITION APPARATUS AND METHOD OF GESTURE RECOGNITION

FIELD OF THE INVENTION

One embodiment of the invention is related to gesture recognition, and more particularly to a gesture recognition apparatus and a method thereof by using Doppler effect.

DESCRIPTION OF RELATED ART

With the development of personal electronic products, interactive ways between people and electronic products are varied, for example mouse input, keyboard input, touchscreen input, and gesture recognition.

Gesture recognition is becoming an increasingly popular means of interacting with computers. Gesture recognition enables humans to communicate with the computers and interact naturally without any mechanical devices. It is possible to point a finger at the computer screen but not touching the screen so that the cursor will move accordingly.

The present gesture recognition can be based on video and sound. However, a video based gesture recognition has weaknesses of huge calculation, high rate of error discrimination and illumination request.

Therefore, an improved gesture recognition apparatus and a method thereof is provided in the embodiment of the present disclosure to solve the problems mentioned above.

BRIEF DESCRIPTION OF THE DRAWINGS

FIG. 6a is a first two-value frequency shift curve of FIG. 5a.

FIG. 7 is a table listing a plurality of gestures and corresponding specifications thereof.

FIG. 8 is a table listing a state sequence module board of gestures.

Figure 1:
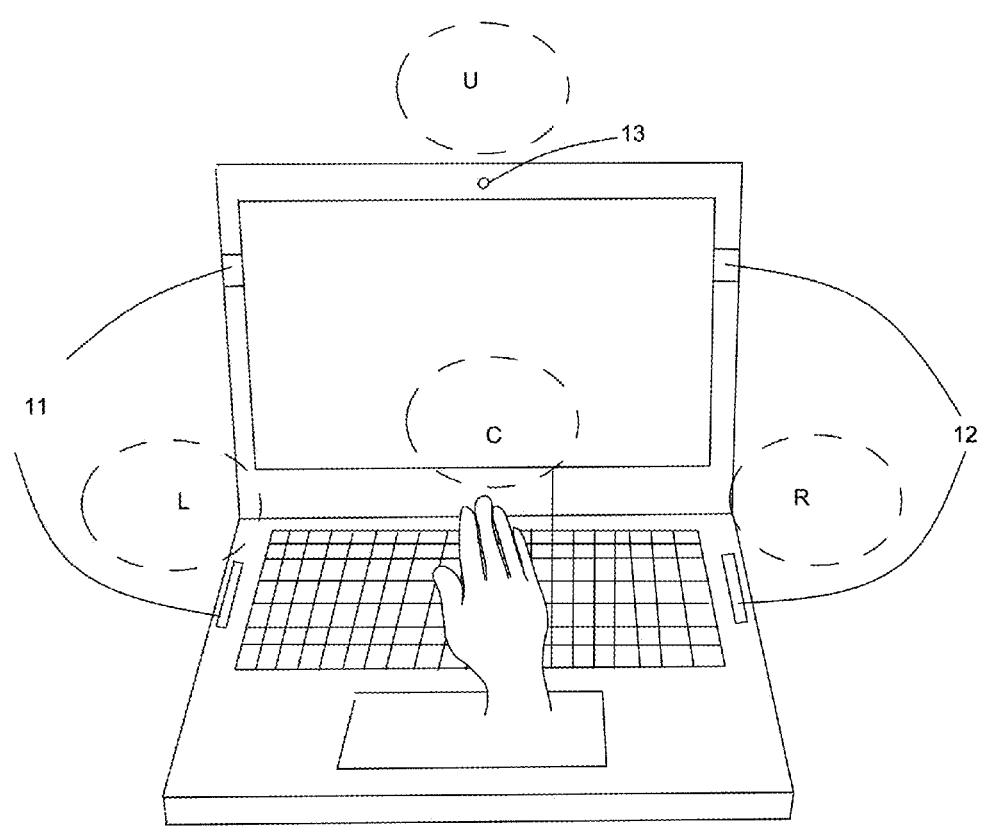
FIG. 1 is an illustrative isometric view of a gesture recognition apparatus applied on a notebook in accordance with the present disclosure.

Many aspects of the embodiments can be better understood with reference to the drawings mentioned above. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

Reference will now be made to describe exemplary embodiments of the present invention in detail. In this section we shall explain several exemplary embodiments of this invention with reference to the appended drawings. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known structures and techniques have not been shown in detail so as not to obscure the understanding of this description.

The present invention is related to sound-based gesture recognition. This technique uses a well-understood phenomenon known as the "Doppler effect" or "Doppler shift", which characterizes the frequency change of a sound wave as a listener moves toward or away from the source. When the source moves towards the listener, the wavelength of the source is shortened and the frequency thereof is increased. It means blue shift is caused. When the source moves away from the listener, the wavelength of the source is lengthened and the frequency thereof is decreased. It means red shift is caused. Red shift is an opposite effect referred to blue shift. Using this effect, the present invention detects motion in front of and around a computing device and recognizes a set of gestures.

Figure 2:
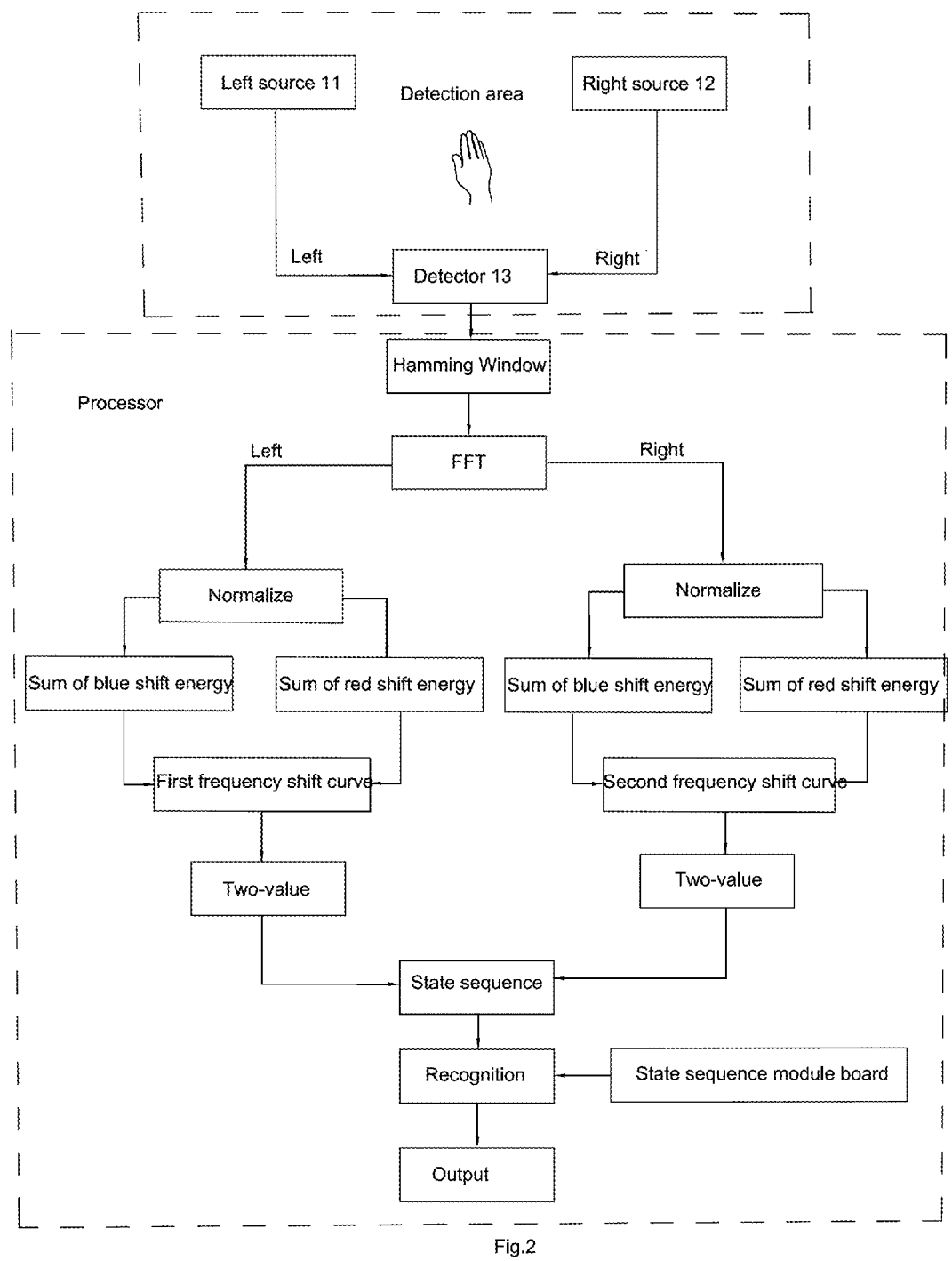
FIG. 2 is a block diagram illustrating a method of gesture recognition in accordance with the present disclosure.

Referring to FIG. 1, the present disclosure of a gesture recognition apparatus 100 includes a left source 11, a right source 12, a detector 13 and a processer (shown in FIG. 2). The gesture recognition apparatus 100 is optionally applied on a notebook, and uses speakers already embedded in the notebook as the left source 11 and the right source 12, and further uses a microphone already exist in the notebook as the detector 13. The left source 11 includes two speakers. The right source 12 includes two speakers. In alternative embodiment, the left source 11 may include one speaker or three speakers, the right source 12 may include one or two more speakers. Alternatively, the gesture recognition apparatus may be applied on a tablet PC or a traditional PC.

The left source 11 and the right source 12 are separately disposed at two sides of the notebook and disposed at symmetrical positions. The detector 13 is disposed between the two sources 11, 12 and disposed at a central line of the two sources 11, 12. A distance from the detector 13 to the left source 12 is equal with that from the detector 13 to the right source 12. The left source 11 keeps a distance of 30-60 cm from the right source 12. The distance from the left source 11 to the second source 12 is determined by actual circumstance corresponding to variable requirements or sensitivities.

The left source 11 and the right source 12 generate inaudible sound waves between 18-22 kHz. The left source 11 generates a left basic signal Fl. The right source 12 generates a right basic signal Fr. A difference of frequency between the left basic signal Fl and the right basic signal Fr is not less than 1 kHz so that sounds from the two sources do not interfere with each other. In this embodiment, a frequency of the left basic signal Fl is 19 kHz, a frequency of the right basic signal Fr is 20 kHz.

Referring to FIG. 1, a detection area is formed in front of the left and right sources 11, 12 and used as an operation space of a user's hand. A distance from the detection area to the left and right sources 11, 12 is roughly 10-40 cm. In this embodiment, 30 cm is selected. The detection area is divided into four regions, region left L, region right R, region up U and region central C. And referring to FIG. 7, it shows a plurality of gestures and corresponding specifications of the gestures. In alternative embodiment, the gesture is not restricted in the table in FIG. 7.

Referring to FIG. 2, when a user moves his hand in the detection area, it reflects the sound waves and causes a frequency shift. The frequency shift is detected by the detector 13. The detector 13 simultaneously detects the left basic signal Fl and the right basic signal Fr because of a part of original sound waves from the left and right sources 11, 12 not reflected by the hand.

The processer is configured to processing signals from the detector 13 and recognize a corresponding gesture.

Referring to FIGS. 2-8, a method of gesture recognition is described below.

S1, the left source 11 and the right source 12 respectively generate a left basic signal Fl and a right basic signal Fh to the detection area.

S2, the detector 13 detects the left basic signal Fl, the right basic signal Fh and Doppler shift signals of the left and right basic signals after reflection by the hand.

S3, the processer is configured to deal with signals from the detector 13 and recognize a gesture. The detailed processing steps are described below.

S31, a Hamming window is windowed on the signals from the detector, the coefficient formula of the Hamming window is shown below.

$$w(n) = 0.54 - 0.46 \csc\left(2\pi \frac{n}{N}\right), 0 \le n \le N$$

where N=L−1, L is a length of the Hamming window same with FFT (Fast Fourier Transform).

L is in a range of 4096-8192. In this embodiment, L is 6144.

S32, the windowed signals is transformed into frequency-domain signals by computing Fast Fourier Transform (FFT), and a length of FFT is same with L.

Figure 3:
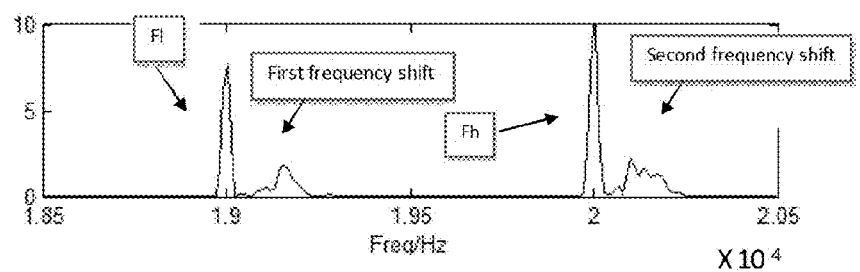
FIG. 3 is a frequency spectrogram of signals after FFT.

Referring to FIG. 3, it shows a frequency spectrogram of signals after FFT. A set of left signals and a set of right signals are shown. The set of left signals include a left basic signal Fl and a first frequency shift of the left basic signal Fl. The set of right signals include a right basic signal Fh and a second frequency shift of the right basic signal Fh, as shown in FIG. 3.

S33, the first frequency shift and the second frequency shift are normalized because an amplification difference between the left and right basic frequency may cause a strength difference of frequency shifts reflected by an identical hand. The first frequency shift is divided by an amplification of the left basic signal Fl. The second frequency shift is divided by an amplification of the right basic signal Fh.

Figure 4:
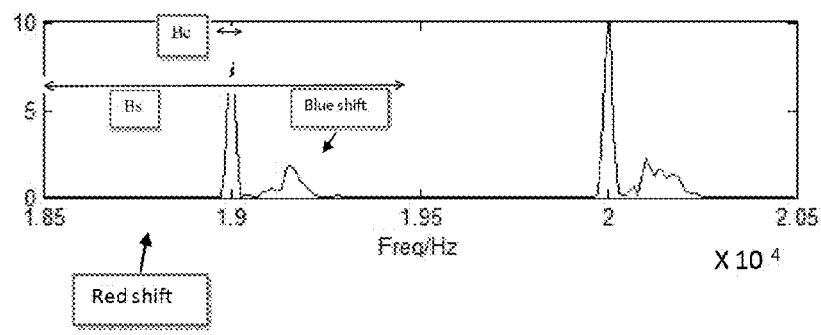
FIG. 4 is the frequency spectrogram of signals in FIG. 3, by presetting bandwidths to define blue shift and red shift.

S34, the processor calculates a sum of blue shift energy of the normalized signals, and a sum of red shift energy of the normalized signals. Referring to FIG. 4, we define Bc as a bandwidth of a basic signal and Bs as a bandwidth of a frequency shift of the basic signal reflected by a hand. In this embodiment, Bc=120 Hz, Bs=1000 Hz. When the frequency shift is higher than the basic signal, the frequency shift is called blue shift. When the frequency shift is lower than the basic signals, the frequency shift is called red shift.

The formula of sum of the red shift or blue shift energy is shown below.

$$E = \Sigma A_k^2, 0 \le k \le M-1$$

Where M is one half of the length of FFT, $A_k$ is an amplification of every frequency of the red shift or blue shift.

We define S as a frequency shift energy in a time interval, $$S = Eb - Er$$

Where Eb is blue shift energy, Er is red shift energy.

Figure 5A:
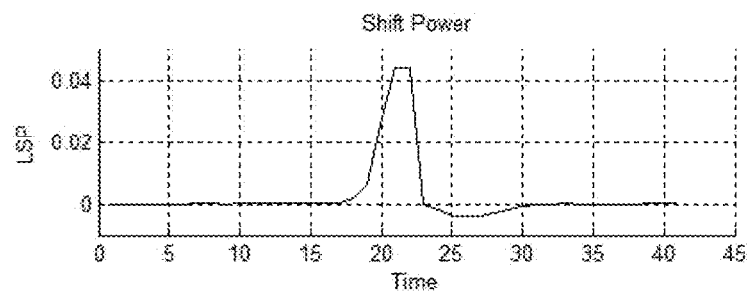
FIG. 5a is a first frequency shift curve of a left basic signal.
Figure 5B:
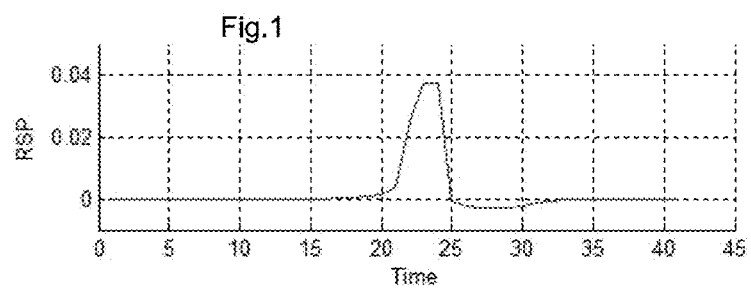
FIG. 5b is a first frequency shift curve of a right basic signal.

Referring to FIG. 5a, we obtain a first frequency shift curve of the left basic signal by linking frequency shift energy of every time interval of the left basic signal. Referring to FIG. 5b, we obtain a second frequency shift curve by linking the frequency shift energy of every time interval of the right basic signal. When the frequency shift curve shows positive, it means blue shift. When the frequency shift curve shows negative, it means red shift.

S35, we select a suitable positive threshold and a negative threshold to simplify the frequency shift curve into a two-value curve. The frequency shift curve is compared with the positive threshold and the negative threshold, "+1" is signed while the frequency shift curve bigger than the positive threshold, "−1" is signed while the frequency shift curve smaller than the negative threshold, and "0" is signed while the frequency shift curve disposed between the positive threshold and the negative threshold. The positive threshold is in a range of 0.00005-0.0005, and the negative threshold is in a range of −0.00005--0.0005. In this embodiment, the positive threshold is 0.0004, the negative threshold is −0.0001.

Figure 6A:
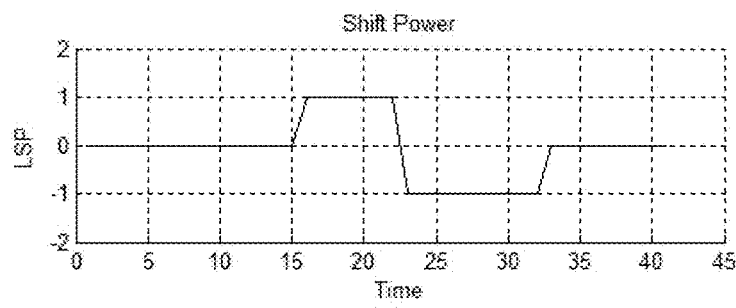
Figure 6B:
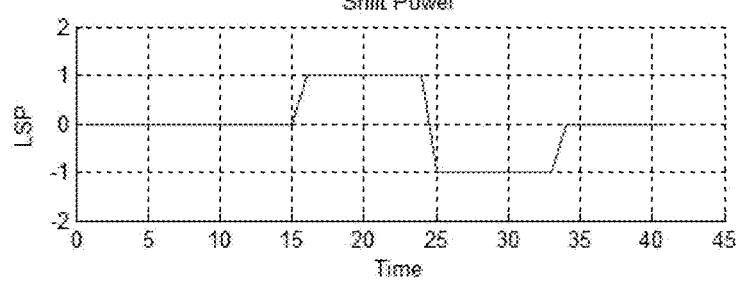
FIG. 6b is a second two-value frequency shift curve of FIG. 5b.

Referring to FIG. 6a, a first two-value frequency shift curve is obtained, and a first state sequence of [+1, −1, −1] is obtained. Referring to FIGS. 6b, a second two-value frequency shift curve is obtained, and a second state sequence of [+1, +1, −1] is obtained. Therefore, a state sequence of [+1 +1, −1, +1, −1 −1] is obtained.

S36, compare the state sequence with a gesture moulding board as shown in FIG. 8 and recognize the gesture L2R.

S37, search the gesture L2R in the table as shown in FIG. 7, and output corresponding orders.

The gesture recognition in accordance with the present disclosure uses speakers and microphone embedded in the notebook, which is good for cost reduction. And a calculation of sound signals is less than that of images.

While the present disclosure has been described with reference to the specific embodiment, the description of the disclosure is illustrative and is not to be construed as limiting the disclosure. Various of modifications to the present disclosure can be made to the exemplary embodiments by those skilled in the art without departing from the true spirit and scope of the disclosure as defined by the appended claims.

What is claimed is:

1. A gesture recognition apparatus, comprising
   a left source configured to generate a left basic signal;
   a right source configured to generate a right basic signal;
   a detector configured to detect the left basic signal and the right basic signal without reflecting by a hand and Doppler shift signals of the left and right basic signals after reflection by the hand, the detector disposed between the left source and the right source; wherein, a difference of frequency between the left basic signal and the second basic signal is not less than 1000 Hz;
   a processer configured for dealing with signals from the detector with a Hamming window and FFT, obtaining a first frequency shift of the left basic signal and a second frequency shift of the right basic signal, normalizing the first frequency shift by dividing by an amplification of the left basic signal, calculating a sum of blue shift energy and a sum of red shift energy of the normalized first frequency shift, and obtaining a first frequency shift energy curve; wherein
   the processor is further configured for normalizing second frequency shift by dividing by an amplification of the right basic signal, calculating a sum of blue shift energy and a sum of red shift energy of the normalized second frequency shift signal, and obtaining a second frequency shift energy curve;
   obtaining a first two-value frequency shift energy curve and a second two-value frequency shift curve by setting thresholds;

extracting a state sequence from the two two-value frequency shift energy curves;
comparing the state sequence with a state sequence module board and recognizing the corresponding gesture;
and outputting a corresponding operation.

2. The gesture recognition apparatus as described in claim 1, wherein the detector is disposed at a central line of the left source and the right source.

3. The gesture recognition apparatus as described in claim 1, wherein a detection area is formed in front of the left source and the right source for the hand's motion.

4. The gesture recognition apparatus as described in claim 1, wherein a distance from the detector to the left source is same with that from the detector to the right source.

5. A gesture recognition apparatus, comprising
a first speaker configured to generate a left basic signal;
a second speaker configured to generate a right basic signal;
a microphone configured to detect the left basic signal and the right basic signal without reflecting by a hand and Doppler shift signals of the left and right basic signals after reflection by the hand, the microphone disposed between the left speaker and the right speaker;
wherein, a difference of frequency between the left basic signal and the second basic signal is not less than 1000 Hz;
a processor configured for dealing with signals from the detector with a Hamming window and FFT, obtaining a first frequency shift of the left basic signal and a second frequency shift of the right basic signal, normalizing the first frequency shift by dividing by an amplification of the left basic signal, calculating a sum of blue shift energy and a sum of red shift energy of the normalized first frequency shift, and obtaining a first frequency shift energy curve; wherein
the processor is further configured for normalizing second frequency shift by dividing by an amplification of the right basic signal, calculating a sum of blue shift energy and a sum of red shift energy of the normalized second frequency shift signal, and obtaining a second frequency shift energy curve;
obtaining a first two-value frequency shift energy curve and a second two-value frequency shift curve by setting thresholds;
extracting a state sequence from the two two-value frequency shift energy curves;
comparing the state sequence with a state sequence module board and recognizing the corresponding gesture;
and outputting a corresponding operation.

6. The gesture recognition apparatus as described in claim 5 further comprising a computer, wherein the first speaker, the second speaker and the microphone are assembled with the computer.

7. The gesture recognition apparatus as described in claim 5, wherein the left basic signal has a frequency different from that of the right basic signal.

8. The gesture recognition apparatus as described in claim 7, wherein the left and right basic signals are inaudible.

9. The gesture recognition apparatus as described in claim 7, wherein the difference between the frequency of the left basic signal and the right basic signal is not less than 1 kHz.

10. method of gesture recognition, comprising the steps of:
sending a left basic signal using a left source;
sending a right basic signal using a right source;
detecting the left basic signal, right basic signal and Doppler shift signals of the left and right basic signals after reflection by a hand using a detector;
processing the signals from the detector with a Hamming window and FFT and obtaining a first frequency shift of the left basic signal and a second frequency shift of the right basic signal;
normalizing the first frequency shift by dividing by an amplification of the left basic signal, calculating a sum of blue shift energy and a sum of red shift energy of the normalized first frequency shift, and obtaining a first frequency shift energy curve;
normalizing second frequency shift by dividing by an amplification of the right basic signal, calculating a sum of blue shift energy and a sum of red shift energy of the normalized second frequency shift signal, and obtaining a second frequency shift energy curve;
obtaining a first two-value frequency shift energy curve and a second two-value frequency shift curve by setting thresholds;
extracting a state sequence from the two two-value frequency shift energy curves;
comparing the state sequence with a state sequence module board and recognizing the corresponding gesture;
outputting a corresponding operation.

11. The method of gesture recognition as described in claim 10, wherein the coefficient formula of the Hamming window is $$w(n) = 0.54 - 0.46 \csc\left(2\pi \frac{n}{N}\right), 0 \le n \le N,$$

where N=L −1, L is a length of the Hamming window.

12. The method of gesture recognition as described in claim 11, wherein L is same with a length of FFT and in a range of 4096-8192.

13. The method of gesture recognition as described in claim 10, wherein 100 Hz is set as a bandwidth of the left or right basic signal and 1000 Hz is set as a bandwidth of the first or second frequency shift before calculating a sum of blue shift energy and a sum of red shift energy of the normalized first or second frequency shift signal.

14. The method of gesture recognition as described in claim 10, wherein the formula of sum of red shift or blue shift energy is $$E = \Sigma A_k^2, 0 \le k \le M-1$$

where M is one half of the length of FFT, $A_k$ is an amplitude of every frequency of red shift or blue shift.

15. The method of gesture recognition as described in claim 14, wherein S is defined as a frequency shift energy in a time interval, the formula thereof is S=Eb−Er, where Eb is blue shift energy, Er is red shift energy.

16. The method of gesture recognition as described in claim 10, wherein the thresholds includes a positive threshold in a range of 0.00005-0.0005, and a negative threshold in a range of -0.00005- -0.0005.

17. The method of gesture recognition as described in claim 10, wherein the left basic signal has a frequency of 19 kHz, and the right basic signal has a frequency of 20 kHz.

* * * * *